United States Patent Office 3,228,901
Patented Jan. 11, 1966

---

3,228,901
COMPOSITIONS COMPRISING AN EPOXY RESIN, SHELLAC, POLYBUTADIENE AND A PEROXIDE CURING AGENT
Ralph G. Flowers, Pittsfield, Mass., assignor to General Electric Company, a corporation of New York
No Drawing. Filed Sept. 11, 1961, Ser. No. 137,060
6 Claims. (Cl. 260—27)

This invention relates to new and improved resinous compositions. More particularly, it relates to resinous compositions which are useful as electrical insulation material, for coating, impregnating, bonding and laminating purposes which are characterized by improved physical qualities and especially by superior adhesive qualities and flexibility.

The use of improved epoxy resins as electrical insulating material for certain applications has been described in Patents 2,769,739 and 2,899,399, assigned to the same assignee as this patent describing the use of compositions comprising epoxy resins and shellac. Certain deficiencies of the epoxy resins using the familiar acidic or basic catalysts were overcome by the use of shellac which combined chemically to form a cured resin. However, in some applications the epoxy resin-shellac compositions described in the above patents are not characterized by the degree of flexibility which is often required along with excellent adhesive bond.

It is a principal object, therefore, of this invention to provide resinous compositions for electrical insulating, bonding, laminating and coating purposes which will have the desirable characteristics of epoxy resin-shellac compositions but at the same time will be possessed of physical ruggedness and especially superior adhesiveness and flexibility when thermoset which is not attainable with prior materials.

Briefly, the present invention relates to resinous compositions comprising, by weight, 100 parts of epoxy resin, from 50 to 250 parts shellac, and from 10 to 100 parts of alkali metal-polymerized polybutadiene, plus from 1 to 15 percent of curing agent for said polybutadiene based on the weight of the polybutadiene. From 1 to 10 parts of dicyandiamide can also be used to provide improved bond strength. The present materials are resistant to the usual solvents and are, therefore, best applied as hot melt materials, and in this role are particularly useful in impregnating, bonding, and coating paper and paper-like materials, paper board, cloth and porous materials in general.

The epoxy resins used in conjunction with my invention are well known in the art. They are described in Castan United States Patents 2,324,483 and 2,444,333, British Patents 518,057 and 579,698. Generally, the epoxy resins described therein are the reaction product of an epihalogenohydrin such as epichlorohydrin and a phenol having at least two phenolic hydroxy groups such as bis-(4-hydroxy phenyl)-2,2-propane. United States Patents 2,494,295; 2,500,600 and 2,511,913 describe further epoxy resins which can be used in conjunction with my invention. The above patents are hereby incorporated by reference in this application. The epoxy resins herein have more than one epoxy group per molecule. They can be prepared by reacting a polyhydroxy alcohol or phenol such as hydroquinone, resorcinol, glycerine and condensation products of phenols with ketones, for example, bis-(4-hydroxy phenyl)-2,2-propane with epichlorohydrin. The reaction of epichlorohydrin with bis-(4-hydroxy phenyl)-2,2-propane is as follows:

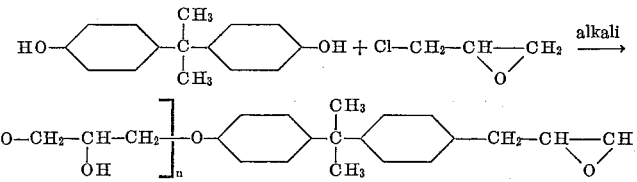

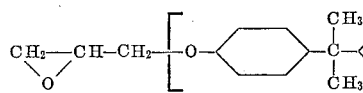

where $n$ has an average value ranging from 0 to about 10. Such ethoxyline resins are sold under the name of Epon, under the name Araldite, as ERL resins, and as Epi-Rez resins. The data given below for such resins is representative.

TABLE I

| Epoxy resin | Epoxide equivalent | M.P., ° C. |
|---|---|---|
| Epon 828 | 192 | 9 |
| Epon 834 | 225–290 | 20–28 |
| Epon 1004 | 905–985 | 97–103 |
| Epon 1007 | 1,600–1,900 | 127–133 |
| Epon 1009 | 2,400–4,000 | 145–155 |
| Epon 1001 | 450–525 | 64–76 |
| Epon 1064 | 300–375 | 40–45 |
| Araldite 6010 | 192 | Liquid |
| Araldite 6020 | 200–205 | Liquid |
| ERL 2774 | 175–200 | Liquid |
| Epi-Rez 510 | 175–200 | Liquid |

Among other useful epoxy resins are those based on other glycidyl type materials as well as those based on aliphatic radicals including oxidized polyolefins among others.

The alkali metal-polymerized polybutadiene used in connection with the present invention contains an appreciable percentage or about 40 percent of 1,2-butadiene polymer and is thus polmerizable by means of the usual vinyl polymerization type catalysts, among which are barium peroxide, sodium peroxide, benzoyl peroxide, tertiary butyl perbenzoate, dicumyl peroxide, tertiary butyl hydroperoxide, among others which are known to those skilled in the art which react above the softening point of the present composition.

In carrying out the invention, the polybutadiene cured or polymerized with an alkali metal or alkali metal type catalyst is milled as on hot rolls along with the epoxy resin and the shellac, the order of addition of the various materials to the rolls not being of any particular consequence. When the materials are thoroughly admixed, the vinyl polymerization catalyst is added. The resultant material, when cooled, is very brittle and can readily be applied as a hot melt material to the desired base. From 1 to 10 parts of dicyandiamide can also be employed to further enhance the bond strength. After application, the composition is cured at a temperature of 125° C. to 175° C. for one-quarter hour to four hours and preferably at a temperature of about 150° C. for one-quarter to one hour at 120° C. for from one half to four hours, it being realized that this curing process is of a time-temperature nature. The cured material is very tough and adherent and is characterized by good impact strength and desirable flexibility. The following examples illustrate the practice of the invention, it being realized that many other applications will occur to those skilled in the art.

*Example 1*

There were milled on hot rolls heated to a temperature of about 100° C., 25 parts of sodium polymerized butadiene with which were blended 100 parts of Epon 1004 and 67 parts of shellac. After a homogeneous composition was attained, three parts of dicumyl peroxide were added and thoroughly mixed with further rolling. The material was removed from the mill and cooled at which point it was rather brittle. This brittle material was melted and hot coated on paper which was laid up into a laminate of layers about 0.1 inch in total thickness. The laminate so formed was cured for one hour at 150° C. to provide a firmly bonded laminate which was somewhat flexible and was particularly characterized by its toughness.

*Example 2*

There were mixed on hot rolls 25 parts of sodium polymerized butadiene, 223 parts of shellac and 100 parts of Epon 1004 as in Example 1, with three parts of dicumyl peroxide added after a homogeneous mix was attained. The product was used to treat paper laminae as in Example 1. Again, the laminate when cured at 150° C. for one hour produced a very hard and tough product, the laminae showing very good adhesion and flexibility.

*Example 3*

Example 1 was repeated using 100 parts of sodium polymerized butadiene, 100 parts of shellac, 100 parts of Epon 1004 and 11 parts of dicumyl peroxide. Once again, the resulting product was hot melted, applied to paper which was laid up into a laminate 0.1 inch thick. The laminate so formed and cured for one hour at 150° C. was more brittle than the products of Examples 1 and 2 but still very useful.

*Example 4*

There were mixed on hot rolls 25 parts of sodium polymerized butadiene, 100 parts of dewaxed shellac and 100 parts of Epon 1007 as in Example 1. Then, 2.5 parts of dicumyl peroxide and 2.5 parts of dicyandiamide were blended into the homogeneous mix and the product was removed and cooled. The dicyandiamide contributes to the bonding strength of the composition. Paper was coated with the above composition by a hot melt process and pressed at 200 p.s.i. into laminates about 50 mils thick and cured for 40 minutes at 150° C. The finished laminate was flexible, tough and excellently bonded.

There are provided then by this invention laminating compositions and laminates prepared therefrom which are useful in preparing layer insulation for electrical purposes, flat laminates for various structural purposes, wound or laminated cylinders, transformer coils and the like, such structures being characterized not only by superior adhesiveness but by such flexibility as to absorb mechanical shock without destruction.

What I claim as new and desire to secure by Letters Patent of the United States is:

1. A composition of matter comprising, by weight, 100 parts of epoxy resin comprising the reaction product of an epihalogenohydrin and a phenol having at least two hydroxy groups, from 50 to 250 parts shellac and from 10 to 100 parts of alkali metal-polymerized polybutadiene along with a peroxide curing agent for said polybutadiene.

2. A composition of matter comprising, by weight, 100 parts of epoxy resin comprising the reaction product of an epihalogenohydrin and a phenol having at least two hydroxy groups, from 50 to 250 parts shellac, from 10 to 100 parts of alkali metal-polymerized polybutadiene, a peroxide curing agent for said polybutadiene and from 1 to 10 parts of dicyandiamide.

3. A composition of matter comprising, by weight, 100 parts of epoxy resin comprising the reaction product of an epihalogenohydrin and a phenol having at least two hydroxy groups containing epoxide groups, 223 parts shellac, 25 parts of alkali metal polymerized polybutadiene containing 1,2-butadiene polymer and a peroxide curing agent for said polybutadiene.

4. A composition of matter comprising, by weight, 100 parts epoxy resin comprising the reaction product of an epihalogenohydrin and a phenol having at least two hydroxy groups containing epoxide groups, 100 parts shellac, 100 parts of alkali metal polymerized polybutadiene containing 1,2-butadiene polymer and a peroxide curing agent for said polybutadiene.

5. A composition of matter comprising, by weight, 100 parts of epoxy resin comprising the reaction product of an epihalogenohydrin and a phenol having at least two hydroxy groups containing 1,2-epoxide groups, 67 parts shellac and 25 parts of alkali metal polymerized polybutadiene containing 1,2-butadiene polymer and a peroxide curing agent for said polybutadiene.

6. A composition of matter comprising, by weight, 100 parts of epoxy resin comprising the reaction product of an epihalogenohydrin and a phenol having at least two hydroxy groups, 100 parts shellac, 25 parts of alkali metal-polymerized polybutadiene, 2.5 parts of a peroxide curing agent for said polybutadiene and 2.5 parts of dicyandiamide.

References Cited by the Examiner

UNITED STATES PATENTS

| | | | |
|---|---|---|---|
| 2,769,739 | 11/1956 | Flowers et al. | 260—24 |
| 2,886,473 | 5/1959 | Schroeder | 260—837 |
| 2,899,399 | 8/1959 | Flowers | 260—24 |
| 2,985,632 | 5/1961 | Willis | 260—27 |

FOREIGN PATENTS

| | | |
|---|---|---|
| 517,816 | 2/1940 | Great Britain. |
| 736,457 | 9/1955 | Great Britain. |
| 841,203 | 6/1960 | Great Britain. |

OTHER REFERENCES

Whitby: "Synthetic Rubber," Wiley & Sons, 954, N.Y., pp. 289–299.

Delmonte: The Technology of Adhesives, 1947, Reinhold Pub. Corp., N.Y., pp. 217–218.

WILLIAM H. SHORT, *Primary Examiner.*

ALFONSO D. SULLIVAN, *Examiner.*

J. ZIEGLER, S. N. RICE, *Assistant Examiners.*